United States Patent [19]
Cutler

[11] 3,792,333
[45] Feb. 12, 1974

[54] FEEDRATE CONTROL SYSTEM FOR NUMERICAL CONTROL APPARATUS

[76] Inventor: Hymie Cutler, 16230 Santa Rosa, Detroit, Mich. 48221

[22] Filed: Dec. 29, 1972

[21] Appl. No.: 319,316

[52] U.S. Cl.............. 318/571, 318/39, 235/151.11
[51] Int. Cl. ........................................ G05b 19/24
[58] Field of Search ......... 318/571, 39; 235/151.11

[56] References Cited
UNITED STATES PATENTS

| | | | |
|---|---|---|---|
| 3,128,374 | 4/1964 | Yuchiho et al. ............... | 318/571 X |
| 3,479,574 | 11/1969 | Kosem ................... | 318/571 |
| 3,569,682 | 3/1971 | Tipton ........................ | 318/571 X |
| 3,657,525 | 4/1972 | Evans.......................... | 235/151.11 |
| 3,665,499 | 5/1972 | Cutler.......................... | 318/571 |
| 3,676,760 | 7/1972 | McDaniel ................... | 318/571 |

*Primary Examiner*—B. Dobeck
*Attorney, Agent, or Firm*—Benjamin J. Barish

[57] ABSTRACT

A feedrate control system for numerical control equipment comprises at least two drives having mutually orthogonal axes of motion, and apparatus for generating axis command pulses supplied to the drives to produce a resultant movement in accordance with a predetermined path and velocity programmed in a program store. The apparatus includes a path generator system operative to generate a train of axes command pulses for each axis to be supplied to the respective drives, and a velocity control system operative to compare the generated axes command pulses with feedrate command data and to produce feed pulses controlling the path generator system. The velocity control system comprises means for converting the feedrate command data to a train of feedrate command pulses; a feedrate command register; an axis command register for each axis; and an error register, two error registers being provided in a three-axis system. The system further comprises means effective upon the occurrence of each axis command pulse for adding the count of the respective axis register into the error register; means effective upon the occurrence of each feedrate command pulse for subtracting the count of the feedrate command register from the error register; and means enabling the path generator system to generate axis command pulses only when the count in the error register is negative.

10 Claims, 3 Drawing Figures

12,792,333

FEEDRATE CONTROL SYSTEM FOR NUMERICAL CONTROL APPARATUS

BACKGROUND OF THE INVENTION

The present invention relates to feedrate control systems for numerical control apparatus, such as machine tools, and also to the numerical control apparatus utilizing such system.

Numerical control apparatus normally includes two or three mutually orthogonal axes drives (referred to as the x-axis, y-axis and z-axis drives), which are supplied with axis command pulses to produce a resultant movement of a member in accordance with a predetermined path and velocity programmed in a program store. The program store contains axes command data representing the programmed movement distances, and feedrate command data representing the programmed movement velocities. Such apparatus further includes a path generator system (sometimes referred to as a contour generating system) operative to generate, in response to the axis command data, a train of axes command pulses for each axis to be supplied to the respective drives; and a velocity control system operative to compare the feedrate command data of the program store with the vector velocity that is the resultant of generated axes command pulses and to produce feed pulses controlling the path generator system such that the resultant vector velocity will correspond to the feedrate command data of the program store.

Systems of the foregoing type are well known, for example as shown in U.S. Pat. Nos. 3,479,574 3,128,374 as well as in my prior U.S. Pat. No. 3,665,499. Such systems are commonly used for controlling machine tools, but may be used in other applications where the movement of a member is to be precisely controlled, for example in drafting or inspection machines.

My copending Patent application Ser. No. 319,317, filed Dec. 29, 1972, discloses another apparatus of this type, and is particularly directed to the path generator system. The present invention is particularly directed to the velocity control system which produces the feed pulses controlling the path generator system, and may be used in the apparatus of that copending patent application.

In machine applications, a speedrate slower than the optimum results in decreased production, whereas one faster than the optimum results in shortening the useful life of the tools. An accurate feedrate system is therefore highly desirable to allow programming as close as possible to the optimum values.

Systems are known for controlling feedrates by comparing the sum of the squares of the velocities commanded by the feedrate generator of the machine tool for the respective axes, with the square of the velocity generated from the feedrate number recorded in the program store, the difference between the two being used to correct the frequency of the signals produced by the feedrate generator. Analog methods may be used to make these calculations, but such systems are relatively expensive, have operating range limitations, have problems with temperature drifts, and require field maintenance training in the special calibrations needed. General purpose computers may be used to perform the vector calculations, but such systems are very costly and moreover may involve undesirable delays or dwells while computations are being completed. U.S. Pat. No. 3,479,574 discloses a digital system for performing this calculation, but that system is quite complicated and expensive. My prior U.S. Pat. No. 3,665,499 discloses another system, but again it is more complicated and costly than the system of the present invention.

SUMMARY OF THE PRESENT INVENTION

The system of the present invention is based on an entirely different principle, in that is does not arithmetically calculate the square root of the sum of the squares as in the prior systems. Instead, the system of the present invention is based on an approximation scheme, but one in which the error is less than one command pulse of motion and, moreover, does not accumulate. Accordingly, while in theory it is an approximation, in practice it is substantially exact. Significantly fewer arithmetic operations are required and accordingly it acts faster and can be implemented with less hardware.

Briefly, according to the present invention the velocity control system, which generates the feed pulses controlling the path generator system, comprises means for converting the feedrate command data to a train of feedrate command pulses. Further, it includes a feedrate command register accumulating the feedrate command pulses, and an axis command register for each axis accumulating the command pulses of its respective axis. The system further includes an error register. Means are provided effective upon the occurrence of each axis command pulse for summing, according to one sign, (e.g. adding) the count of the respective axis register into the error register, and means effective upon the occurrence of each feedrate command pulse for summing, according to the opposite sign, (e.g. subtracting) the count of the feedrate command register from the error register. The path generator system is enabled to generate axis command pusles only when the count in the error register is of the said opposite sign (e.g. negative).

Further features and advantages of the invention will be apparent from the description below.

BRIEF DESCRIPTION OF THE DRAWINGS

The invention is herein described, somewhat diagrammatically and by way of example only, with reference to the accompanying drawings, wherein.

DESCRIPTION OF THE PREFERRED EMBODIMENT

OVERALL SYSTEM OF FIG. 1

Figure 1:
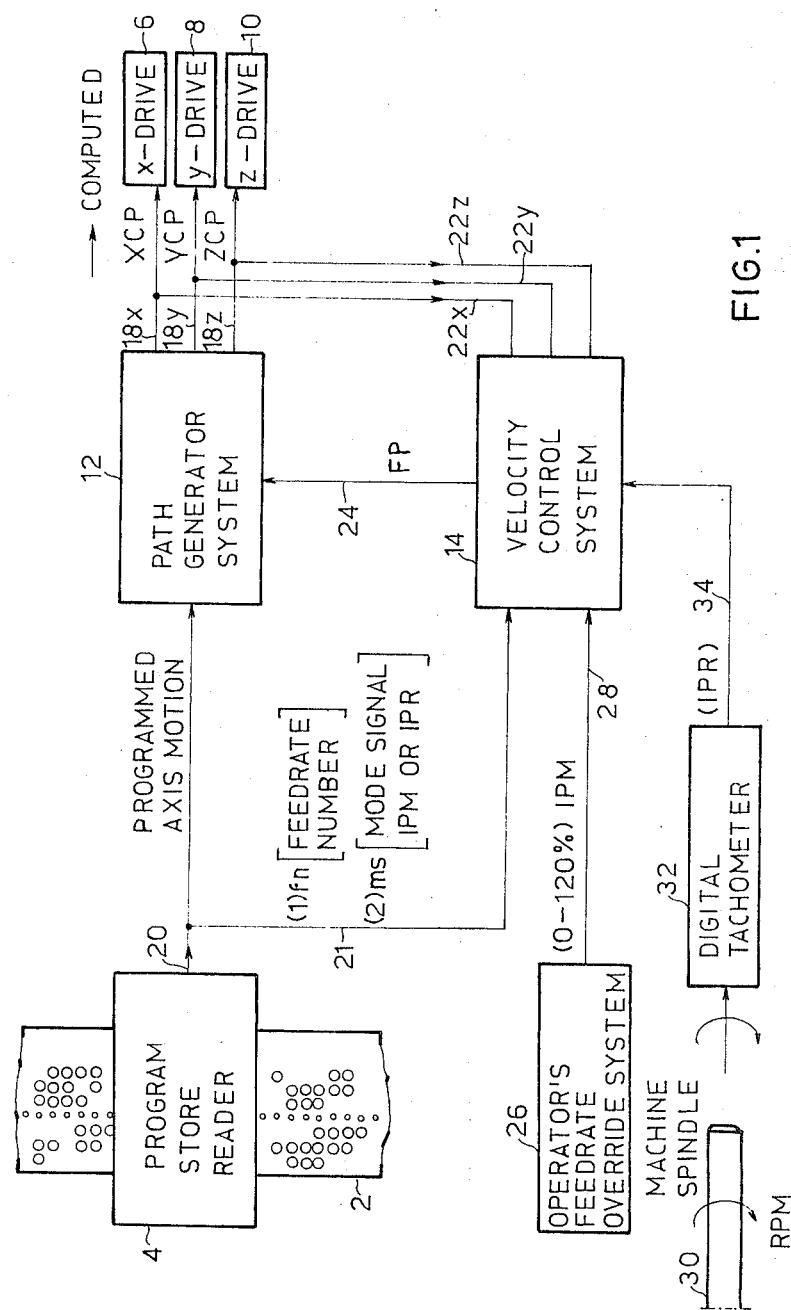
FIG. 1 is a functional block diagram illustrating a three-axis numerical control system constructed in accordance with the present invention.

As shown generally in FIG. 1, the overall numerical control system includes a program store 2 that supplies the data for the sequence of motions to be performed by the equipment being controlled. The data store 2 is shown for purposes of example as being a coded punched paper tape with the data being read by a reader 4, but it will be appreciated that other forms of data stores could be used, for example magnetic tape, MOS memories, or the like.

The system of FIG. 1 includes three drives, namely x-axis drive 6, y-axis drive 8, and z-axis drive 10, having mutually orthogonal axes of motion. Each axis drive receives the axis command pulses (hereinafter called XCP, YCP and ZCP pulses) produced by the path generator system 12 from the data contained in the program store 2 as fed to it by reader 4. The path generator system 12 is controlled by a velocity control system 14, in a manner to be described more specifically below. The path generator 12 supplies the axis command pulses, via lines 18x, 18y, 18z to the axes drives at such coordinated rate that the resultant movement of the member (such as a machine tool) driven by the drives traces the exact path (e.g. straight-line or circular) and in accordance with the exact velocity, programmed in the program store 2. The steps of motion applied by the axes drives are so small and so rapidly performed that the motion is effectively smooth and continuous.

Path generator system 12, sometimes called a contour generating system, may be of any well known type, e.g. for generating linear, circular, parabolic, hyperbolic or other paths. Examples are described in the above-cited patents, a preferred form being described in my above-cited copending application.

Program store 2 supplies, via line 20 from reader 4, several types of program or command data:

First, it supplies axes command data representing the programmed axes distances to be fed to the axes drives 6, 8, 10. This data is supplied to the path generator system 12 which is operative to generate a train of axes command pulses (XCP, YCP, ZCP) to be applied to the respective drive (6, 8, 10) via lines 18x, 18y and 18z.

Secondly, program store 2 supplies feedrate command data, i.e., the feedrate number (fn), representing the programmed vector velocities. This data is supplied via line 21 to the velocity control system 14. System 14 also receives, via lines 22x, 22y, 22z, the generated axes command pulses produced by the path generator system 12. It continually compares the vector velocity thereof with the feedrate command data and produces feed pulses FP which are supplied via line 24 to the path generator 12 to control same such that the resultant vector velocity will correspond to the command feedrate data.

The system of the present invention also provides for direct programming of distance-per-revolution (e.g. inches-per-revolution, hereinafter "IPR") or distance-per-minute (e.g., inches per-minute, hereinafter called "IPM"). For both cases, the inches refer to vector distance of travel and the unit of measure could as well be in millimeters. An operator's override system 26 may be used to effect via line 28 an increase or decrease of the programmed rate, up to 120 percent. In single-point turning operations, the IPR is the thickness of the chip being cut, which is a basic machining parameter. The velocity control system 14 performs the necessary calculations on-line using the actual speed of the machine spindle 30 as measured by a sensor, illustrated in FIG. 1 as a digital tachometer 32, the speed data being supplied to the velocity control system 14 via line 34.

The system thus accurately produces the programmed chip-thickness irrespective of variations in the spindle speed. If the machine is equipped with a variable speed drive, the operator may override, via the override system 26, the programmed spindle speeds without changing the thickness of the chips being cut. This is an important advantage in the system illustrated when seeking the best machining conditions, since without this direct programming of the IPR feedrate, the IPM velocity has to be calculated from the value of the desired chip thickness and the nominal spindle speed.

To effect either an IPM or IPR mode of operation, program store 2 supplies, via line 21, the appropriate IPM or IPR mode signal (ms), as well as the feedrate number (fn) mentioned above, to the velocity control system 14.

The output of the velocity control system 14, as indicated above, consists of feed pulses FP supplied to the path generator system 12, which in turn generates the train of axes command pulses XCP, YCP and ZCP, supplied to the respective axes drives 6, 8, 10. The velocity control system 14 performs the necessary computations, digitally and on-line, so that the FP signals produced will cause the resultant vector distance of the combined motions of the axes, per unit time, to be equal to the commanded value of IPM when in that mode. When the apparatus is operating in the IPR mode, the resultant vector distance that the axes move for each revolution of the machine spindle will be equal to the programmed value of IPR.

The velocity control system 14 includes a generator for producing feed command-pulses (fCP) from the command feedrate number fn. This is illustrated in the functional block diagram of FIG. 2. System 14 further includes a three-axis vector computation logic, illustrated in the functional block diagram of FIG. 3, which compares the feed command-pulses fCP with the axis command pulses XCP, YCP, ZCP, to produce the feed pulses FP controlling the path generator system 12. In the IPM mode, the rate the fCP pulses are produced is a direct function of the product of the operator's feedrate override setting supplied from the override system 26, and the programmed value of IPM supplied from the program store 2. In the IPR mode, the rate the fCP pulses are produced is a direct function of the product of the operator's feedrate override setting, the programmed value of IPR, and the machine tool spindle speed. Scaling factors are also provided.

FEED COMMAND-PULSE GENERATOR OF FIG. 2

Figure 2:
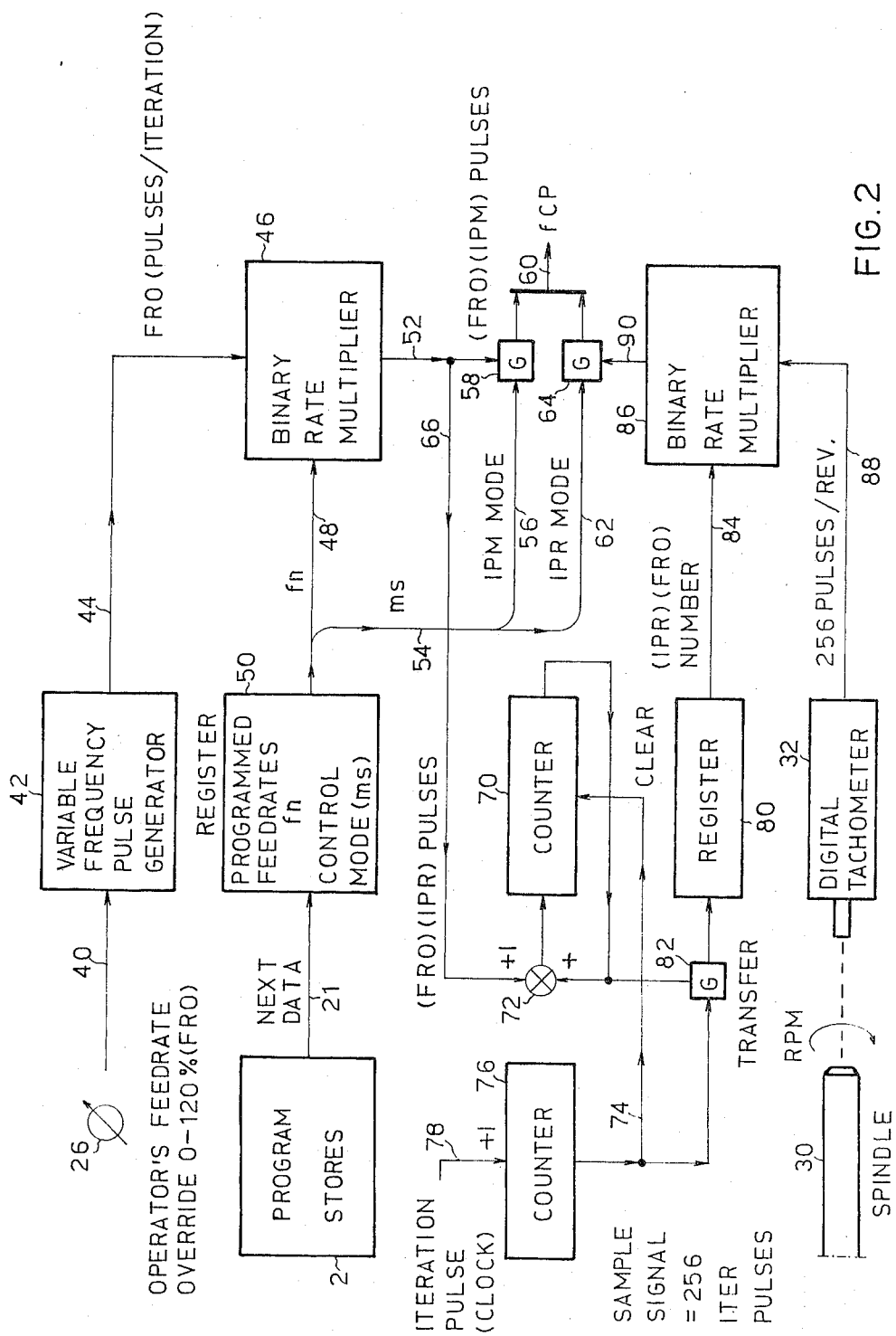
FIG. 2 is a functional block diagram illustrating a feed command-pulse generator in the velocity control system of FIG. 1.

The feed command-pulse (fCP) generator portion of the velocity control system 14 is illustrated in FIG. 2.

It will be seen that the operator's feedrate override system 26, which may be set to provide an override of up to 120 percent, controls, via line 40, a variable frequency pulse generator 42. The output of the latter generator appears as feedrate override signal FRO (pulses per iteration) on line 44 which pulses are supplied to one input of a binary rate multiplier 46. The other input of multiplier 46 is supplied, via line 48, with the feedrate number (fn) either in terms of IPM or IPR, depending upon the operational mode specified in the program store. This feedrate number is supplied via line 21 and is stored in a register 50. The control mode signal ms, supplied by the program store, is also stored in register 50. Because of the provision of storage register 50, the program store needs to supply this data only when it is to be changed.

Multiplier 36 multiplies the feedrate override pulses FRO with the feedrate number fn, the product appearing on output line 52.

If the IPM mode had been specified by the program store, the mode signal fed from storage register 50 will be applied via line 56 to gate 58 so that the multiplier product on line 52 will appear as the fCP pulses on output line 60.

On the other hand, if an IPR mode had been specified by the program store, the mode signal ms from storage register 50 will appear on line 62 applied to gate 64, and therefore the multiplier product on line 52 will not pass through gate 58, but rather will be fed via line 66 to a system for converting the data to the IPR mode.

The latter system comprises a counter 70 receiving the output pulses from multiplier 52 via an adder 72. The counter is reset to zero at a fixed sample interval via line 74 from a second counter 76 receiving iteration or clock pulses via line 78. The count of counter 70 at each fixed sample interval (e.g. after 256 iteration pulses of counter 76) is transferred to a register via gate 82, and the output of the latter register is applied via line 84 to one input of a second binary rate multiplier 86. The second input of the latter multiplier is fed, via line 88, with pulses having a frequency corresponding to the speed of rotation of the machine spindle 30, the latter being measured by digital tachometer 32.

The product of multiplier 86 is fed, via line 90 and gate 64 opened by the IPR mode signal on line 62, to the output line 60, where it appears as the fCP pulses.

It will be seen that the feed command-pulses fCP will appear on output line 60 at a rate corresponding to the commanded vector velocity specified by the feedrate command data (feedrate number fn) in the program store. These fCP pulses are then applied to the vector computation logic system illustrated in FIG. 3. The fCP pulses have the same pulse value as the axes pulses.

VECTOR COMPUTATION LOGIC SYSTEM OF FIG. 3

Figure 3:
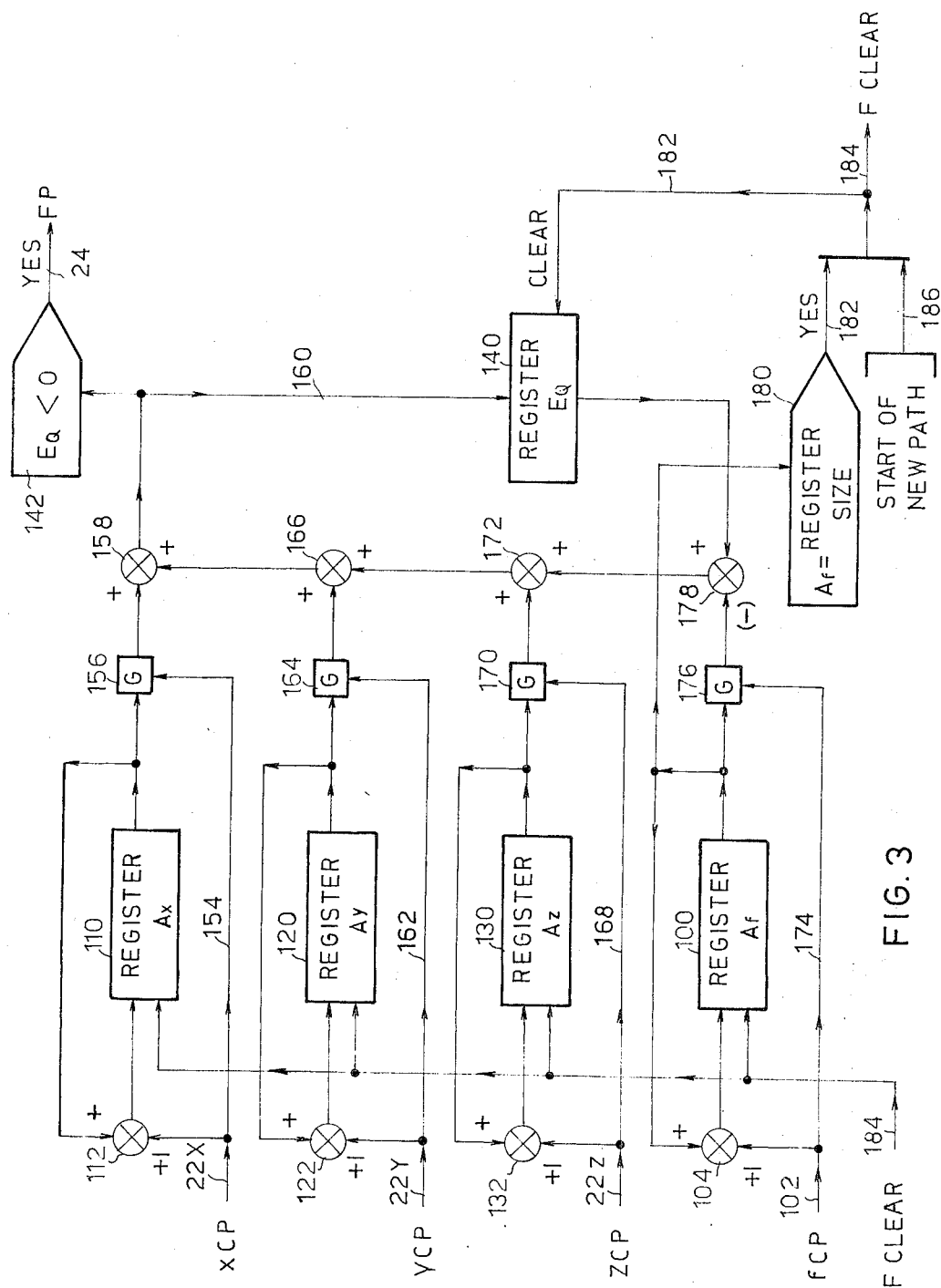
FIG. 3 is a functional block diagram illustrating the vector computation logic portion of the velocity control system of FIG. 1.

The system illustrated in FIG. 3 compares the rate of the feed command-pulses fCP with the rate of the axes command pulses XCP, YCP, ZCP and produces feed pulses FP which are used to control the path generator system 12 such that the vector velocity resulting from the axis command pulses will correspond to the vector velocity corresponding to the program store feed rate command data. Thus, the output from the vector computation logic system of FIG. 3 is the feed pulses FP supplied to the path generator system 12. In the latter system, as indicated earlier, the FP pulses cause axes command pulses to be produced in the precise ratio that they were programmed. If the actual vector velocity computed from the axes command pulses (XCP, YCP, ZCP) exceeds the commanded feedrate value (fn), the FP signal is turned off; but if it is less than the commanded feedrate, the FP signal will be turned on and will cause more axes command pulses to be produced.

For purposes of performing this vector computation, the system of FIG. 3 includes a feedrate command register 100 accumulating the feed command-pulses fCP introduced via input line 102 and adder 104. The count of the fCP pulses within register 100 is indicated as Af. The system includes three further registers, namely register 110 accumulating the axis command pulses XCP fed thereto via input line 22x and adder 112, register 120 accumulating the y-axis command pulses YCP fed thereto via input line 22y and adder 122, and register 130 accumulating the z-axis command pulses ZCP fed thereto via line 22z and adder 132. The contents of the respective registers are indicated respectively as Ax, Ay and Az. The system further includes an error register 140 connected to a sign detector 142, which detects the sign of the contents of the error register.

Means are provided effective upon the occurrence of each axis command pulse for adding the count of the respective axis register into the error register. Thus, each XCP pulse is fed via line 154 to gate 156 to cause the contents of x-register 110 to be added, via adder 158 and line 160, into error register 140. Similarly, each YCP pulse is fed via line 162 to gate 164 which causes the contents of the y-register 120 to be added, via adder 166 and line 160, into error register 140; and each ZCP pulse is fed via line 168 to gate 170 causing the contents of the z-register 130 to be added via adder 172 and line 160, into error register 140.

Means are also provided effective upon the occurrence of each feed command-pulse fCP for subtracting the count of the fCP pulse register 100 from the contents of error register 140. The latter means comprises line 174 which conducts each fCP pulse to gate 176 to cause the contents of the register 100 to be subtracted (via adder 178, after a change in sign) from the contents of error register 140.

Sign detector 142 continuously monitors the sign of the contents of error register 140. Whenever the sign becomes negative, a feed pulse FP is produced on output line 24. As indicated earlier, each time an FP pulse is produced, it causes the path generator system 12 to supply another axis command pulse XCP, YCP or ZCP. This in turn will make the contents of the error register 140 more positive. When the error register becomes zero or positive, the generation of the feed pulse FP will terminate, and thus no additional axis command pulses will be supplied until after the system receives the next feed command-pulse fCP.

A capacity detector 180 is provided for the fCP pulse register 100, so that when the latter register reaches the limit of its capacity, a CLEAR signal is produced on line 182. This clears the error register 140 via line 182, and also the other registers 100, 110, 120, 130, via line 184. A similar capacity detector may be provided for the other registers, so that when any one reaches the limit of its capacity, all are cleared. Further, the registers are all cleared when a new motion command starts, this signal being applied to the register clearing system via line 186.

The vector computation logic system illustrated in FIG. 3, does not arithmetically calculate (to determine Af) the square root of the sum of the squares (i.e. the square root of $Ax^2 + Ay^2 + Az^2$) as in the prior systems, but rather approximates this calculation in such manner that the error produced is less than one command pulse of motion. Further, this error does not accumulate. Considering that this is a digital system, an error that is always less than one count represents exact operation. Therefore the system in practice is exact. It should be noted, however, that a count may be lost when a register reaches its capacity and is cleared, but that error can be made as small as required by making the register of the appropriate large size.

The system of the present invention thus effectively produces results which are equally as accurate as the more complicated and costly prior systems mentioned earlier. With less operations required, not only is the logic hardware reduced, but also faster feedrates can be provided without resorting to expensive parallel arithmetic hardware.

There are many applications for solving vector problems according to the present invention other than the velocity control described above. For example, the invention may also be embodied in cutter size compensation control, to permit the tool center to be displaced normal to the programmed path by a distance either selected by the operator or provided in the program. For such an application, the axis offsets have to be calculated so that the distance normal to the tool path is as commanded. That involves a vector computation that is the same as the velocity control system described above.

Many other variations, modifications and applications of the illustrated embodiment will be apparent.

Two numerical examples are set forth below showing the vector computations provided by the use of the system of the present invention. Table 1 illustrates a two-dimensional case with the motion vector at 45° (i.e. $Ax = Ay$); and Table 2 illustrates a three-dimensional case where the motion vector is at a different angle to each of the planes; in this case $Ax:Ay:Az = 1:\frac{1}{2}:\frac{1}{3}$.

TABLE 1

| f | | x | | y | | $E_Q$ | FP | $\sqrt{A_x^2 + A_y^2}$ | ERROR |
|---|---|---|---|---|---|---|---|---|---|
| CP | A | CP | A | CP | A | | | | |
| 1 | 1 | 0 | 0 | 0 | 0 | -1 | 1 | | |
| | | 1 | 1 | 0 | | 0 | 0 | | |
| 1 | 2 | 0 | | 0 | | -2 | 1 | | |
| | | 0 | | 1 | 1 | -1 | 1 | | |
| | | 1 | 2 | 0 | | +1 | 0 | | |
| 1 | 3 | 0 | | 0 | | -2 | 1 | | |
| | | 0 | | 1 | 2 | 0 | 0 | 2.83 | 0.17 |
| 1 | 4 | 0 | | 0 | | -4 | 1 | | |
| | | 1 | 3 | 0 | | -1 | 1 | | |
| | | 0 | | 1 | 3 | +2 | 0 | 4.24 | 0.24 |
| 1 | 5 | 0 | | 0 | | -3 | 1 | | |
| | | 1 | 4 | 0 | | +1 | 0 | | |
| 1 | 6 | 0 | | 0 | | -5 | 1 | | |
| | | 0 | | 1 | 4 | -1 | 1 | | |
| | | 1 | 5 | 0 | | +4 | 0 | | |
| 1 | 7 | 0 | | 0 | | -3 | 1 | | |
| | | 0 | | 1 | 5 | +2 | 0 | 7.07 | 0.07 |
| 1 | 8 | 0 | | 0 | | -6 | 1 | | |
| | | 1 | 6 | 0 | | 0 | 0 | | |
| 1 | 9 | 0 | | 0 | | -9 | 1 | | |
| | | 0 | | 1 | 6 | -3 | 1 | | |
| | | 1 | 7 | 0 | | +4 | 0 | | |
| 1 | 10 | 0 | | 0 | | -6 | 1 | | |
| | | 0 | | 1 | 7 | +1 | 0 | | |
| 1 | 11 | 0 | | 0 | | -10 | 1 | | |
| | | 1 | 8 | 0 | | -2 | 1 | | |
| | | 0 | | 1 | 8 | +6 | 0 | 11.31 | 0.31 |
| 1 | 12 | 0 | | 0 | | -6 | 1 | | |
| | | 1 | 9 | 0 | | +3 | 0 | | |
| 1 | 13 | 0 | | 0 | | -10 | 1 | | |
| | | 0 | | 1 | 9 | -1 | 1 | | |
| | | 1 | 10 | 0 | | +9 | 0 | | |
| 1 | 14 | 0 | | 0 | | -5 | 1 | | |
| | | 0 | | 1 | 10 | +5 | 0 | 14.14 | 0.14 |
| 1 | 15 | 0 | | 0 | | -10 | 1 | | |
| | | 1 | 11 | 0 | | +1 | 0 | | |
| 1 | 16 | 0 | | 0 | | -15 | 1 | | |
| | | 0 | | 1 | 11 | -4 | 1 | | |
| | | 1 | 12 | 0 | | +8 | 0 | | |
| 1 | 17 | 0 | | 0 | | -9 | 1 | | |
| | | 0 | | 1 | 12 | +3 | 0 | 16.97 | 0.03 |
| 1 | 18 | 0 | | 0 | | -15 | 1 | | |

TABLE 1 (cont.)

| f | | x | | y | | $E_Q$ | FP | $\sqrt{A_x^2+A_y^2}$ | ERROR |
|---|---|---|---|---|---|---|---|---|---|
| CP | A | CP | A | CP | A | | | | |
|   |   | 1 | 13 | 0 |   | -2 | 1 |   |   |
|   |   | 0 |   | 1 | 13 | +11 | 0 |   |   |
| 1 | 19 | 0 |   | 0 |   | -8 | 1 |   |   |
|   |   | 1 | 14 | 0 |   | +6 | 0 |   |   |
| 1 | 20 | 0 |   | 0 |   | -14 | 1 |   |   |
|   |   | 0 |   | 1 | 14 | 0 | 0 |   |   |
| 1 | 21 | 0 |   | 0 |   | -21 | 1 |   |   |
|   |   | 1 | 15 | 0 |   | -6 | 1 |   |   |
|   |   | 0 |   | 1 | 15 | +9 | 0 | 21.2 | 0.2 |
| 1 | 22 | 0 |   | 0 |   | -13 | 1 |   |   |
|   |   | 1 | 16 | 0 |   | +3 | 0 |   |   |
| 1 | 23 | 0 |   | 0 |   | -20 | 1 |   |   |
|   |   | 0 |   | 1 | 16 | -4 | 1 |   |   |
|   |   | 1 | 17 | 0 |   | +13 | 0 |   |   |
| 1 | 24 | 0 |   | 0 |   | -11 | 1 |   |   |
|   |   | 0 |   | 1 | 17 | +6 | 0 |   |   |
| 1 | 25 | 0 |   | 0 |   | -19 | 1 |   |   |
|   |   | 1 | 18 | 0 |   | -1 | 1 |   |   |
|   |   | 0 |   | 1 | 18 | +17 | 0 | 25.47 | 0.47 |
| 1 | 26 | 0 |   | 0 |   | -9 | 1 |   |   |
|   |   | 1 | 19 | 0 |   | +10 | 0 |   |   |
| 1 | 27 | 0 |   | 0 |   | -17 | 1 |   |   |
|   |   | 0 |   | 1 | 19 | +2 | 0 | 26.89 | 0.11 |
| 1 | 28 | 0 |   | 0 |   | -26 | 1 |   |   |
|   |   | 1 | 20 | 0 |   | -6 | 1 |   |   |
|   |   | 0 |   | 1 | 20 | +14 | 0 | 28.3 | 0.3 |
| 1 | 29 | 0 |   | 0 |   | -15 | 1 |   |   |
|   |   | 1 | 21 | 0 |   | +6 | 0 |   |   |
| 1 | 30 | 0 |   | 0 |   | -24 | 1 |   |   |
|   |   | 0 |   | 1 | 21 | -3 | 1 |   |   |
|   |   | 1 | 22 | 0 |   | +19 | 0 |   |   |
| 1 | 31 | 0 |   | 0 |   | -12 | 1 |   |   |
|   |   | 0 |   | 1 | 22 | +10 | 0 | 31.12 | 0.12 |
| 1 | 32 | 0 |   | 0 |   | -22 | 1 |   |   |
|   |   | 1 | 23 | 0 |   | +1 | 0 |   |   |
| 1 | 33 | 0 |   | 0 |   | -32 | 1 |   |   |
|   |   | 0 |   | 1 | 23 | -9 | 1 |   |   |
|   |   | 1 | 24 | 0 |   | +15 | 0 |   |   |
| 1 | 34 | 0 |   | 0 |   | -19 | 1 |   |   |
|   |   | 0 |   | 1 | 24 | +5 | 0 |   |   |
| 1 | 35 | 0 |   | 0 |   | -30 | 1 |   |   |
|   |   | 1 | 25 | 0 |   | -5 | 1 |   |   |
|   |   | 0 |   | 1 | 25 | +20 | 0 | 35.38 | 0.38 |
| 1 | 36 | 0 |   | 0 |   | -16 | 1 |   |   |
|   |   | 1 | 26 | 0 |   | +10 | 0 |   |   |
| 1 | 37 | 0 |   | 0 |   | -27 | 1 |   |   |
|   |   | 0 |   | 1 | 26 | -1 | 1 |   |   |
|   |   | 1 | 27 | 0 |   | +26 | 0 |   |   |
| 1 | 38 | 0 |   | 0 |   | -12 | 1 |   |   |
|   |   | 0 |   | 1 | 27 | +15 | 0 | 38.20 | 0.20 |
| 1 | 39 | 0 |   | 0 |   | -24 | 1 |   |   |
|   |   | 1 | 28 | 0 |   | +4 | 0 |   |   |
| 1 | 40 | 0 |   | 0 |   | -36 | 1 |   |   |
|   |   | 0 |   | 1 | 28 | -8 | 1 |   |   |

TABLE 1 (cont.)

| f | | x | | y | | $E_Q$ | FP | $\sqrt{A_x^2+A_y^2}$ | ERROR |
|---|---|---|---|---|---|---|---|---|---|
| CP | A | CP | A | CP | A | | | | |
|  |  | 1 | 29 | 0 |  | +21 | 0 | | |
| 1 | 41 | 0 |  | 0 |  | -20 | 1 | | |
|  |  | 0 |  | 1 | 29 | +9 | 0 | | |
| 1 | 42 | 0 |  | 0 |  | -33 | 1 | | |
|  |  | 1 | 30 | 0 |  | -3 | 1 | | |
|  |  | 0 |  | 1 | 30 | +27 | 0 | 42.41 | 0.41 |

TABLE 2

| f | | x | | y | | z | | $E_Q$ | FP | $\sqrt{A_x^2+A_y^2+A_z^2}$ | ERROR |
|---|---|---|---|---|---|---|---|---|---|---|---|
| CP | A | CP | A | CP | A | CP | A | | | | |
| 1 | 1 | 0 | 0 | 0 | 0 | 0 | 0 | -1 | 1 | | |
|  |  | 1 | 1 | 0 |  | 0 |  | 0 | 0 | | |
| 1 | 2 | 0 |  | 0 |  | 0 |  | -2 | 1 | | |
|  |  | 1 | 2 | 1 | 1 | 0 |  | +1 | 0 | | |
| 1 | 3 | 0 |  | 0 |  | 0 |  | -2 | 1 | | |
|  |  | 1 | 3 | 0 |  | 1 | 1 | +2 | 0 | | |
| 1 | 4 | 0 |  | 0 |  | 0 |  | -2 | 1 | | |
|  |  | 1 | 4 | 1 | 2 | 0 |  | +4 | 0 | 4.5826 | 0.5826 |
| 1 | 5 | 0 |  | 0 |  | 0 |  | -1 | 1 | | |
|  |  | 1 | 5 | 0 |  | 0 |  | +4 | 0 | | |
| 1 | 6 | 0 |  | 0 |  | 0 |  | -2 | 1 | | |
|  |  | 1 | 6 | 1 | 3 | 1 | 2 | +9 | 0 | | |
| 1 | 7 | 0 |  | 0 |  | 0 |  | +2 | 0 | | |
| 1 | 8 | 0 |  | 0 |  | 0 |  | -6 | 1 | | |
|  |  | 1 | 7 | 0 |  | 0 |  | +1 | 0 | | |
| 1 | 9 | 0 |  | 0 |  | 0 |  | -8 | 1 | | |
|  |  | 1 | 8 | 1 | 4 | 0 |  | +4 | 0 | 9.1652 | 0.1652 |
| 1 | 10 | 0 |  | 0 |  | 0 |  | -6 | 1 | | |
|  |  | 1 | 9 | 0 |  | 1 | 3 | +6 | 0 | | |
| 1 | 11 | 0 |  | 0 |  | 0 |  | -5 | 1 | | |
|  |  | 1 | 10 | 1 | 5 | 0 |  | +10 | 0 | | |
| 1 | 12 | 0 |  | 0 |  | 0 |  | -2 | 1 | | |
|  |  | 1 | 11 | 0 |  | 0 |  | +9 | 0 | | |
| 1 | 13 | 0 |  | 0 |  | 0 |  | -4 | 1 | | |
|  |  | 1 | 12 | 1 | 6 | 1 | 4 | +18 | 0 | | |
| 1 | 14 | 0 |  | 0 |  | 0 |  | +4 | 0 | 14. | 0 |
| 1 | 15 | 0 |  | 0 |  | 0 |  | -11 | 1 | | |
|  |  | 1 | 13 | 0 |  | 0 |  | +2 | 0 | | |
| 1 | 16 | 0 |  | 0 |  | 0 |  | -4 | 1 | | |
|  |  | 1 | 14 | 1 | 7 | 0 |  | +17 | 0 | | |
| 1 | 17 | 0 |  | 0 |  | 0 |  | 0 | 0 | | |
| 1 | 18 | 0 |  | 0 |  | 0 |  | -18 | 1 | | |
|  |  | 1 | 15 | 0 |  | 1 | 5 | +2 | 0 | | |
| 1 | 19 | 0 |  | 0 |  | 0 |  | -17 | 1 | | |
|  |  | 1 | 16 | 1 | 8 | 0 |  | +7 | 0 | 18.5742 | 0.4258 |
| 1 | 20 | 0 |  | 0 |  | 0 |  | -13 | 1 | | |
|  |  | 1 | 17 | 0 |  | 0 |  | +4 | 0 | | |
| 1 | 21 | 0 |  | 0 |  | 0 |  | -17 | 1 | | |
|  |  | 1 | 18 | 1 | 9 | 1 | 6 | +16 | 0 | | |

TABLE 2 (cont.)

| f | | x | | y | | z | | $E_Q$ | FP | $\sqrt{A_x^2+A_y^2+A_z^2}$ | ERROR |
|---|---|---|---|---|---|---|---|---|---|---|---|
| CP | A | CP | A | CP | A | CP | A | | | | |
| 1 | 22 | 0 | | 0 | | 0 | | -6 | 1 | | |
| | | 1 | 19 | 0 | | 0 | | +13 | 0 | | |
| 1 | 23 | 0 | | 0 | | 0 | | -10 | 1 | | |
| | | 1 | 20 | 1 | 10 | 0 | | +20 | 0 | | |
| 1 | 24 | 0 | | 0 | | 0 | | -4 | 1 | | |
| | | 1 | 21 | 0 | | 1 | 7 | +24 | 0 | | |
| 1 | 25 | 0 | | 0 | | 0 | | -1 | 1 | | |
| | | 1 | 22 | 1 | 11 | 0 | | +32 | 0 | | |
| 1 | 26 | 0 | | 0 | | 0 | | +6 | 0 | 25.5734 | 0.4266 |
| 1 | 27 | 0 | | 0 | | 0 | | -21 | 1 | | |
| | | 1 | 23 | 0 | | 0 | | +2 | 0 | | |
| 1 | 28 | 0 | | 0 | | 0 | | -26 | 1 | | |
| | | 1 | 24 | 1 | 12 | 1 | 8 | +18 | 0 | | |
| 1 | 29 | 0 | | 0 | | 0 | | -11 | 1 | | |
| | | 1 | 25 | 0 | | 0 | | +14 | 0 | | |
| 1 | 30 | 0 | | 0 | | 0 | | -16 | 1 | | |
| | | 1 | 26 | 1 | 13 | 0 | | +23 | 0 | | |
| 1 | 31 | 0 | | 0 | | 0 | | -8 | 1 | | |
| | | 1 | 27 | 0 | | 1 | 9 | +28 | 0 | 31.2890 | 0.2890 |
| 1 | 32 | 0 | | 0 | | 0 | | -4 | 1 | | |
| | | 1 | 28 | 1 | 14 | 0 | | +38 | 0 | | |
| 1 | 33 | 0 | | 0 | | 0 | | +5 | 0 | | |
| 1 | 34 | 0 | | 0 | | 0 | | -29 | 1 | | |
| | | 1 | 29 | 0 | | 0 | | 0 | 0 | | |
| 1 | 35 | 0 | | 0 | | 0 | | -35 | 1 | | |
| | | 1 | 30 | 1 | 15 | 1 | 10 | +20 | 0 | | |
| 1 | 36 | 0 | | 0 | | 0 | | -16 | 1 | | |
| | | 1 | 31 | 0 | | 0 | | +15 | 0 | | |
| 1 | 37 | 0 | | 0 | | 0 | | -22 | 1 | | |
| | | 1 | 32 | 1 | 16 | 0 | | +26 | 0 | 37.1484 | 0.1484 |
| 1 | 38 | 0 | | 0 | | 0 | | -12 | 1 | | |
| | | 1 | 33 | 0 | | 1 | 11 | +32 | 0 | | |
| 1 | 39 | 0 | | 0 | | 0 | | -7 | 1 | | |
| | | 1 | 34 | 1 | 17 | 0 | | +44 | 0 | | |
| 1 | 40 | 0 | | 0 | | 0 | | +4 | 0 | | |
| 1 | 41 | 0 | | 0 | | 0 | | -37 | 1 | | |
| | | 1 | 35 | 0 | | 0 | | -2 | 1 | | |
| | | 1 | 36 | 1 | 18 | 1 | 12 | +64 | 0 | | |
| 1 | 42 | 0 | | 0 | | 0 | | +22 | 0 | | |
| 1 | 43 | 0 | | 0 | | 0 | | -21 | 1 | | |
| | | 1 | 37 | 0 | | 0 | | +16 | 0 | 42.8602 | 0.1398 |
| 1 | 44 | 0 | | 0 | | 0 | | -28 | 1 | | |
| | | 1 | 38 | 1 | 19 | 0 | | +29 | 0 | | |
| 1 | 45 | 0 | | 0 | | 0 | | -16 | 1 | | |
| | | 1 | 39 | 0 | | 1 | 13 | +36 | 0 | | |
| 1 | 46 | 0 | | 0 | | 0 | | -10 | 1 | | |
| | | 1 | 40 | 1 | 20 | 0 | | +50 | 0 | | |
| 1 | 47 | 0 | | 0 | | 0 | | +3 | 0 | | |
| 1 | 48 | 0 | | 0 | | 0 | | -45 | 1 | | |
| | | 1 | 41 | 0 | | 0 | | -4 | 1 | | |
| | | 1 | 42 | 1 | 21 | 1 | 14 | +73 | 0 | | |
| 1 | 49 | 0 | | 0 | | 0 | | +24 | 0 | | |
| 1 | 50 | 0 | | 0 | | 0 | | -26 | 1 | | |
| | | 1 | 43 | 0 | | 0 | | +17 | 0 | 49.8598 | 0.1402 |

TABLE 2 (cont.)

| f | | x | | y | | z | | $E_Q$ | FP | $\sqrt{A_x^2+A_y^2+A_z^2}$ | ERROR |
|---|---|---|---|---|---|---|---|---|---|---|---|
| CP | A | CP | A | CP | A | CP | A | | | | |
| 1 | 51 | 0 | | 0 | | 0 | | -34 | 1 | | |
| | | 1 | 44 | 1 | 22 | 0 | | +32 | 0 | | |
| 1 | 52 | 0 | | 0 | | 0 | | -20 | 1 | | |
| | | 1 | 45 | 0 | | 1 | 15 | +40 | 0 | | |
| 1 | 53 | 0 | | 0 | | 0 | | -13 | 1 | | |
| | | 1 | 46 | 1 | 23 | 0 | | +56 | 0 | | |
| 1 | 54 | 0 | | 0 | | 0 | | +2 | 0 | | |
| 1 | 55 | 0 | | 0 | | 0 | | -53 | 1 | | |
| | | 1 | 47 | 0 | | 0 | | -6 | 1 | | |
| | | 1 | 48 | 1 | 24 | 1 | 16 | +82 | 0 | | |
| 1 | 56 | 0 | | 0 | | 0 | | +26 | 0 | 56. | 0 |

What is claimed is:

1. Apparatus for generating axis command pulses to be supplied to at least two drives having mutually orthogonal axes of motion to produce a resultant movement of a member in accordance with a predetermined path and velocity programmed in a program store, the program store including axes command data representing the programmed axes distances and feedrate command data representing the programmed vector velocities, the apparatus comprising: a path generator system operative to generate, in response to the program store axes command data, a train of axes command pulses for each axis, to be supplied to the respective drives, and a velocity control system operative to compare the program store feedrate command data with the vector velocity that is the resultant of the generated axes command pulses and to produce feed pulses controlling the path generator system such that said resultant vector velocity will correspond to said program store feedrate command data; said velocity control system comprising: means for converting the feedrate command data to a train of feedrate command pulses; a feedrate command register accumulating said feedrate command pulses; an axis command register for each axis, accumulating the command pulses of its respective axis; an error register; means effective upon the occurrence of each axis command pulse for summing, according to one sign, the count of the respective axis register into the error register; means effective upon the occurrence of each feedrate command pulse for summing, according to the opposite sign, the count of the feed-rate command register into the error register; and means enabling the path generator system to generate axis command pulses only when the count in the error register is of said opposite sign.

2. Apparatus as defined in claim 1, wherein: the means effective upon the occurrence of each axis command pulse adds the count of the respective axis register into the error register; the means effective upon the occurrence of each feedrate command pulse subtracts the count of the feedrate command register from the error register; and said enabling means enables the path generator system to generate axis command pulses only when the error register is negative.

3. Apparatus as defined in claim 1, further including means for clearing all said registers when the feedrate command register reaches the limit of its capacity.

4. Apparatus as defined in claim 1, further including means for clearing all said registers upon receiving a new motion command from the program store.

5. Apparatus according to claim 1, wherein the means for converting the feedrate command data to a train of feedrate command pulses comprises a pulse generator and a multiplier receiving the pulses produced by the pulse generator at one of its inputs, and the feedrate command data at another of its inputs.

6. Apparatus as defined in claim 5, wherein said pulse generator is of variable frequency, and said apparatus further includes an operator feedrate over-ride controlling the frequency of the pulse generator.

7. Apparatus as defined in claim 6, further including mode controlling means enabling the apparatus to operate according to the distance-per-minute mode or the distance-per-revolution mode; said apparatus further including, to enable its operation in the latter mode, a counter receiving the output pulses from said multiplier, means for resetting the counter to zero at a fixed sample interval, a second multiplier, means for applying the count of said latter counter to one input of said second multiplier, and a spindle-driven digital tachometer supplying pulses to the other input of said second multiplier.

8. Numerical control equipment for moving a member in accordance with a predetermined path, comprising: apparatus for generating axis command pulses as defined in claim 1, means for introducing path and feedrate data into said apparatus for generating said axis command pulses; and at least two drives having mutually orthogonal axes of motion controlled by the generated axes command pulses to produce a resultant movement of the member driven by the drives in accordance with said path and feedrate data.

9. Apparatus for generating axis command pulses to be supplied to at least two drives having mutually orthogonal axes of motion to produce a resultant movement of a member in accordance with a predetermined path, comprising, a path generator system operative to generate, in response to axes command data introduced into the apparatus, a train of axes command pulses for each axis to be supplied to the respective drives, and a control system operative to compare the generated axes command pulses with vector command data introduced into the apparatus and to produce feed pulses controlling the path generator system, said latter control system comprising: means for converting the vector command data to a train of vector command pulses; a vector command register accumulated said vector command pulses; an axis command register for each axis accumulating the command pulses of its respective axis; an error register; means effective upon the occurrence of each axis command pulse for summing, according to one sign, the count of the respective axis register into the error register; means effective upon the occurrence of each vector command pulse for summing, according to the opposite sign, the count of the feedrate command register into the error register; and means enabling the path generator system to generate axis command pulses only when the count in the error register is of said opposite sign.

10. Apparatus for generating axis command pulses to be supplied to at least two drives having mutually orthogonal axes of motion to produce a resultant movement of a member in accordance with a predetermined path and velocity programmed in a program store, the program store including axes command data representing the programmed axes distances and feedrate command data representing the programmed vector velocity, the apparatus comprising a path generator system operative to generate, in response to the program store axes command data, a train of axes command pulses for each axis to be supplied to the respective drives, and a velocity control system operative to compare the program store feedrate command data with the vector velocity that is the resultant of said generated axes command pulses and to produce feed pulses controlling the path generator system such that said resultant vector velocity will correspond to said program store feedrate command data; said velocity control system comprising means for converting the feedrate command data to a train of feedrate command pulses; a feedrate command register accumulating said feedrate command pulses; an axis command register for each axis, accumulating the command pulses for its respective axis; an error register; means effective upon the occurrence of each axis command pulse for adding the count in the respective axis command register into the error register; means effective upon the occurrence of each feedrate command pulse for subtracting the count in the feedrate command register from the error register; means enabling the path generator system to generate axis command pulses only when the count in the error register is negative; means for clearing all said registers when the feedrate command register reaches the limit of its capacity; and means for clearing all said registers upon receiving a new motion command from the program store.

* * * * *